(12) United States Patent
Hatori

(10) Patent No.: US 8,086,035 B2
(45) Date of Patent: Dec. 27, 2011

(54) IMAGE PROCESSING APPARATUS AND IMAGE PROCESSING METHOD

(75) Inventor: Kazushige Hatori, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 741 days.

(21) Appl. No.: 12/243,513

(22) Filed: Oct. 1, 2008

(65) Prior Publication Data

US 2009/0087091 A1    Apr. 2, 2009

(30) Foreign Application Priority Data

Oct. 2, 2007   (JP) ................. 2007-259234

(51) Int. Cl.
*G06K 9/00* (2006.01)
(52) U.S. Cl. .................................... 382/167
(58) Field of Classification Search .......... 382/162–167, 382/205; 358/1.9, 518; 345/427, 589–604
See application file for complete search history.

(56) References Cited

U.S. PATENT DOCUMENTS

| 7,027,067 | B1 | 4/2006 | Ohga |
| 7,072,507 | B2 | 7/2006 | Ohga |
| 7,420,559 | B2 * | 9/2008 | Kokojima et al. ............ 345/427 |
| 7,804,630 | B2 * | 9/2010 | Nishikawa ..................... 358/518 |
| 7,957,044 | B2 * | 6/2011 | Nishikawa ..................... 358/518 |

FOREIGN PATENT DOCUMENTS

| JP | 2000-040140 A | 2/2000 |
| JP | 2002-204372 A | 7/2002 |

* cited by examiner

*Primary Examiner* — Ishrat I Sherali
(74) *Attorney, Agent, or Firm* — Carter, DeLuca, Farrell & Schmidt, LLP

(57) ABSTRACT

When converting image data constituted by a plurality of objects to data for an output device, color appearances of object images specified as a same output color are set so as to not vary even when their respective background colors vary. A color appearance model forward conversion section uses forward conversion of a color appearance model to calculate target appearance colors, which are targets of appearances of objects based on color information of the objects. A surrounding adaptive background color obtaining section generates surrounding adaptive background colors based on pixels around a pixel of interest for object images that have undergone rendering. Then, output pixel values of the pixel of interest are calculated by a color appearance model reverse conversion section using reverse conversion of the color appearance model based on the target appearance color and the surrounding adaptive background colors.

10 Claims, 6 Drawing Sheets

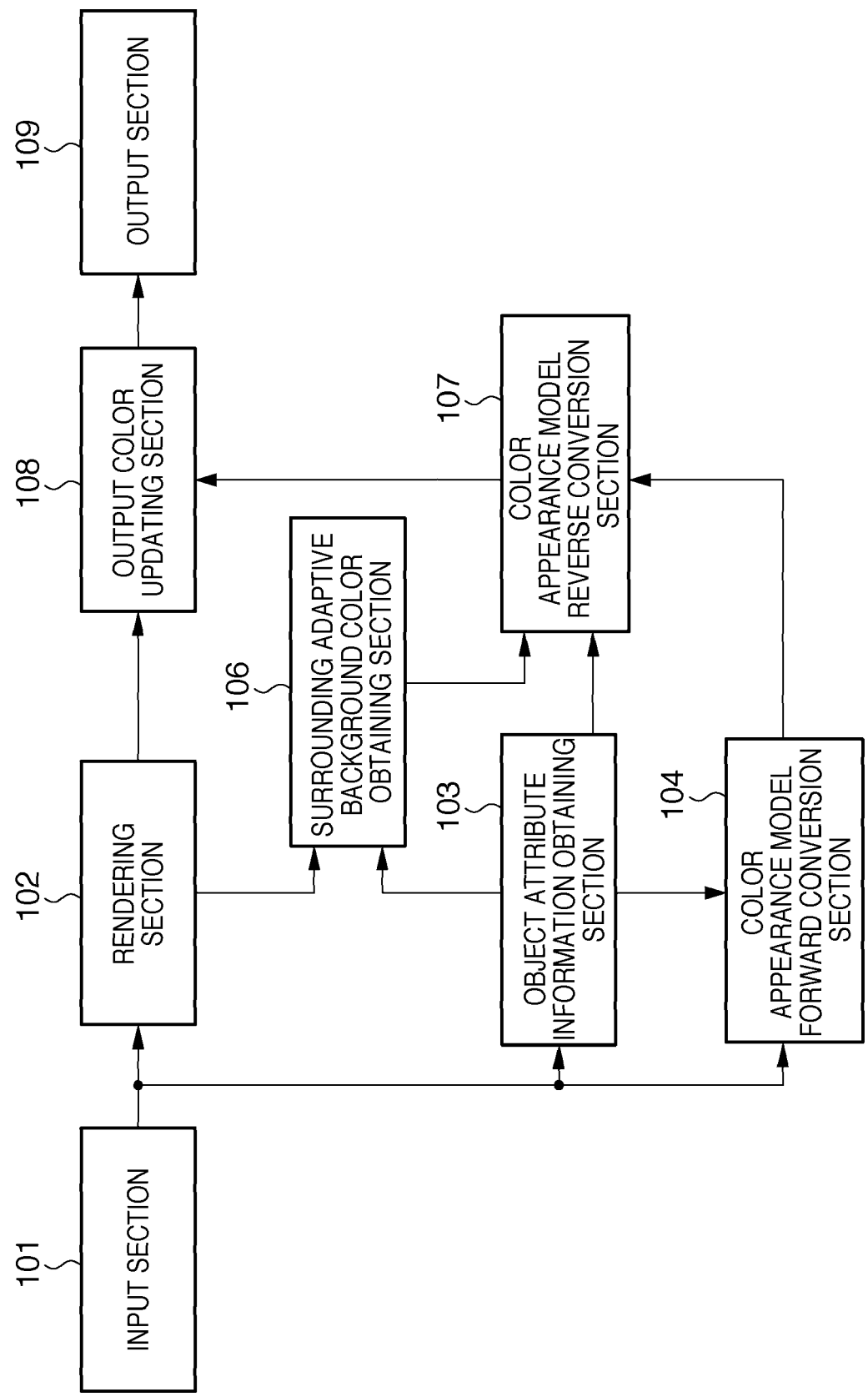

FIG. 4

```
<rect x="1.5" y="1.5"
fill="#FF7F00"
stroke="#000000"
stroke-width="3"
width="150"
height="100"
color_appearance_accordance="ON"/>  ~401
```

FIG. 5

OBJECT LIST FOR ACHIEVING ACCORDANCE IN APPEARANCE COLOR

| OBJECT ID | sRGB | sRGB DISPLAY COLOR | INFORMATION OF IMAGE REGION |
|---|---|---|---|
| 1 | #FF7F00 | | <rect.../> |
| 2 | #FF7F00 | | <rect.../> |
| 3 | #FF7F00 | | <rect.../> |
| ⋮ | | | |

IMAGE PROCESSING APPARATUS AND IMAGE PROCESSING METHOD

BACKGROUND OF THE INVENTION

1. Field of the Invention

The present invention relates to image processing apparatuses and image processing methods, and particularly relates to image processing apparatuses and image processing methods in which image data constituting objects is converted to data for output to an output device.

2. Description of the Related Art

Heretofore, color matching technologies based on color appearance models that take into account ambient light and observation conditions have been known as technologies aiming to achieve color appearance and calorimetric accordance and metamerism using ambient light and observation conditions and the like.

With these color-matching technologies, in a case where a certain document is to be observed under different observation conditions such as ambient light and background colors, it is possible to achieve accordance in the appearance of the displayed document and the printed output thereof in each of these respective observation conditions. For example, using a color appearance model such as CIECAM97s through to the subsequently improved CIECAM02, color matching can be carried out giving consideration to the appearance in a certain observation light conditions on the output side. That is, accordance in appearance can be achieved under mutually different observation conditions (for example, see Japanese Patent Laid-Open No. 2000-040140).

However, with the aforementioned conventional technologies, there is a following problem in a case where a plurality of objects of an identical color are present within a single sheet of a document even when under observation conditions that have been specified in advance.

Namely, a plurality of object images arranged within the data of a single document are influenced by the surrounding background color where the object images are arranged, thus changing the color appearance that is perceived. Examples of this are shown in FIG. 3. In FIG. 3, objects 301, 302, and 303 all have identical color values and are output as identical colors, but have respectively different background colors. Consequently, the objects 301, 302, and 303 have undesirably different color appearances due to the influence of their background colors. For example, the object 301 has a lighter background than the object 302, and therefore appears darker. And due to the gradations in the background of the object 303, the left side part of the object 303 appears darker than the right side part. It should be noted that differences in lightness according to grayscale data are illustrated in FIG. 3, but of course the same applies for chromatic color. With chromatic colors, colors even more different in hue and lightness are perceived undesirably due to an influence of chromatic adaptation for surrounding background colors.

With the aforementioned conventional technologies, it has not been possible to eliminate the influence of background color adaptation for a plurality of objects respectively having a same output color specified within a single sheet of a document and achieve accordance in appearance among these.

SUMMARY OF THE INVENTION

The present invention has been devised to address these problems and to provide an image processing apparatus and an image processing method having the following functionality, namely, causing accordance of mutual color appearance for a plurality of objects for which a same output color has been specified within a same image even when these have respectively different background colors.

Namely, an image processing apparatus, for converting an image having a plurality of objects, is provided with: a rendering unit configured to perform rendering on an image using object information of the plurality of objects, a forward conversion unit configured to carry out forward conversion processing of a color appearance model on color information of the object in which a pixel of interest is contained, and calculate target color information of the pixel of interest, a surrounding adaptive background color obtaining unit configured to generate surrounding adaptive background color information of the pixel of interest based on pixels around the pixel of interest in the object of the image that has undergone rendering, a reverse conversion unit configured to carry out reverse conversion of a color appearance model on the target color information based on the surrounding adaptive background color information to calculate output color information, and a setting unit configured to set the output color information as color information of the pixel of interest in the image that has undergone rendering.

For example, the object includes a color appearance accordance attribute, and the reverse conversion means of the color appearance model controls whether or not to calculate output pixel values for the object in response to the color appearance accordance attribute of the object.

With the present invention configured as described above, it is possible to cause accordance of mutual color appearance for a plurality of objects for which a same output color has been specified within a same image even when these have respectively different background colors.

Further features of the present invention will become apparent from the following description of exemplary embodiments with reference to the attached drawings.

BRIEF DESCRIPTION OF THE DRAWINGS

FIG. 1 is a block diagram showing a functional configuration of a color conversion device according to one embodiment of the present invention.

FIG. 4 is a diagram showing attributes of an object image according to the present embodiment.

FIG. 5 is a diagram showing an example of contents of an object information list according to the present embodiment.

DESCRIPTION OF THE EMBODIMENTS

Figure 2A:
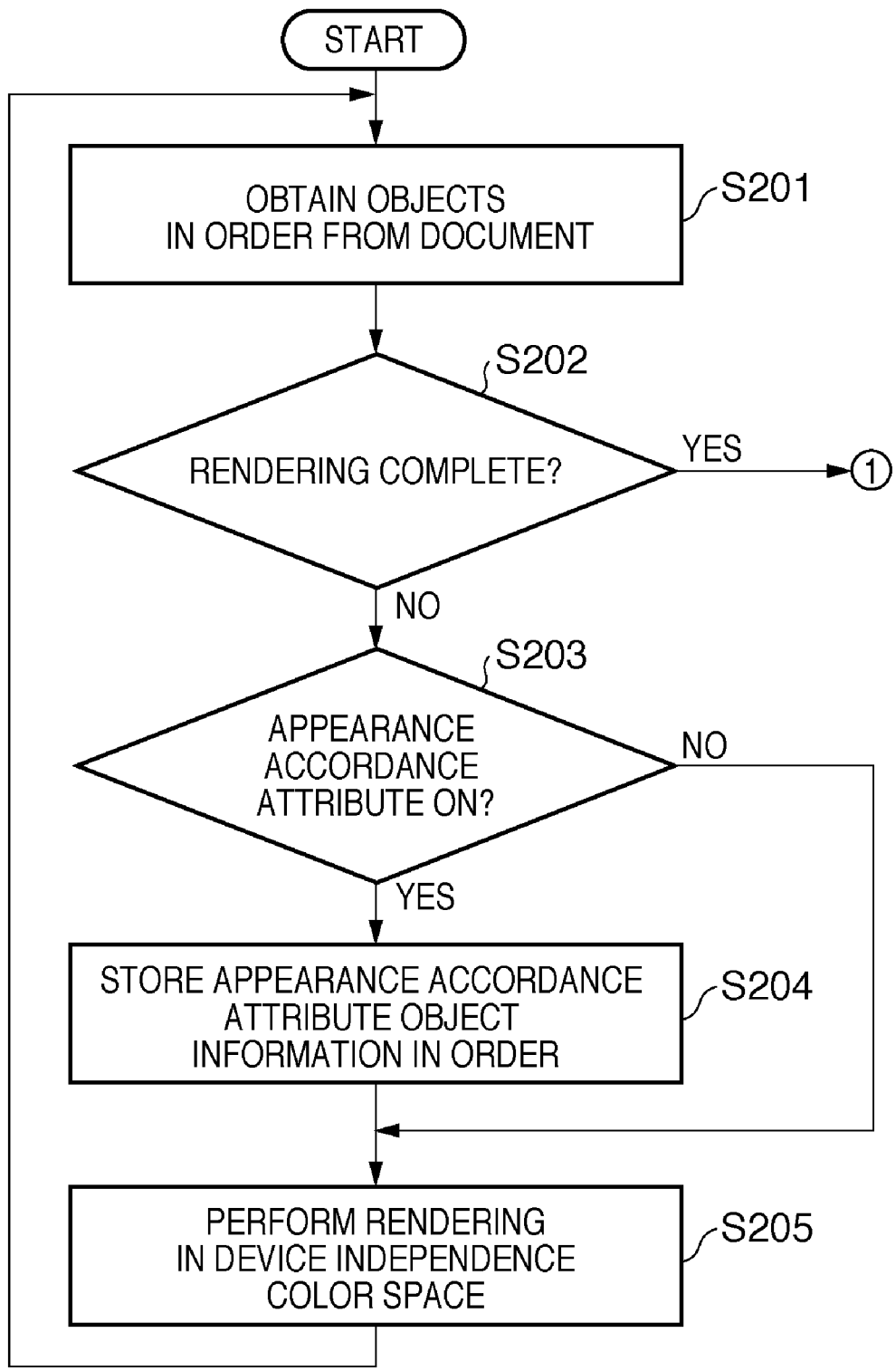
FIG. 2A and FIG. 2B are a flowchart showing a color conversion process according to the present embodiment.

The present invention is described in detail below based on preferred embodiments thereof with reference to the accompanying drawings. It should be noted that any configuration shown in the following embodiments is merely an example and the present invention is not limited to configurations shown in the diagrams.

Configuration of Color Conversion Device

In the present embodiment, consideration is given to an influence of adaptation for background color (hereinafter, background color adaptation) in output images when carrying out color conversion on input images for output in systems ranging from systems that perform display on display devices such as displays to systems that perform print output of document data containing object images.

FIG. 1 is a block diagram showing a functional configuration of a color conversion device that executes color conversion processing according to the present embodiment. First, in the present embodiment, document data having object images is input to an input section 101, which is an input device. Then, ordinary rendering is executed on the document data by a rendering section 102, and at the same time, attribute information of the object images is obtained by an object attribute information obtaining section 103.

Then, by further executing forward conversion of a color appearance model based on attribute information of the object images in a color appearance model forward conversion section 104, target appearance colors indicating appearances of the colors in the final output image according to the present embodiment are calculated.

A surrounding adaptive background color obtaining section 106 obtains a surrounding adaptive background color of the objects from the rendering images obtained by the rendering section 102 to achieve accordance of appearance for the objects. The obtaining of the surrounding adaptive background colors is carried out based on attribute information of the object images obtained by the object attribute information obtaining section 103.

Then, output colors are calculated by color appearance model reverse conversion according to the target appearance color values and the surrounding adaptive background colors in a color appearance model reverse conversion section 107. Then, an output color updating section 108 overwrites output colors of object image regions using output colors calculated by the color appearance model reverse conversion section 107 and display or printed output of these is performed from an output section 109, which is an output device.

Object Attributes

Here, description is given using FIG. 4, regarding the structure of attributes of object images contained in document data used in the present embodiment. It should be noted that description is given following the SVG (scalable vector graphics) format for object image data in the present embodiment in order to simplify description.

A color appearance accordance attribute (color_appearance_accordance) 401 as shown in FIG. 4 is appended as an attribute of object images in the present embodiment. Namely, in a case where the color appearance accordance attribute 401 is "ON," indication is given to an effect that the object in question is to be output (displayed/printed) having a color whose appearance accords with the target appearance color. That is, in a case where a same output color is specified for a plurality of object images in a document and the color appearance accordance attributes of these are respectively "ON," it is expected that the output of these objects will have the same appearance. In the present embodiment, according to the indication of the color appearance accordance attribute 401, the objects 301, 302, and 303 shown in FIG. 3 for example will be output using colors having a same appearance.

Figure 3:
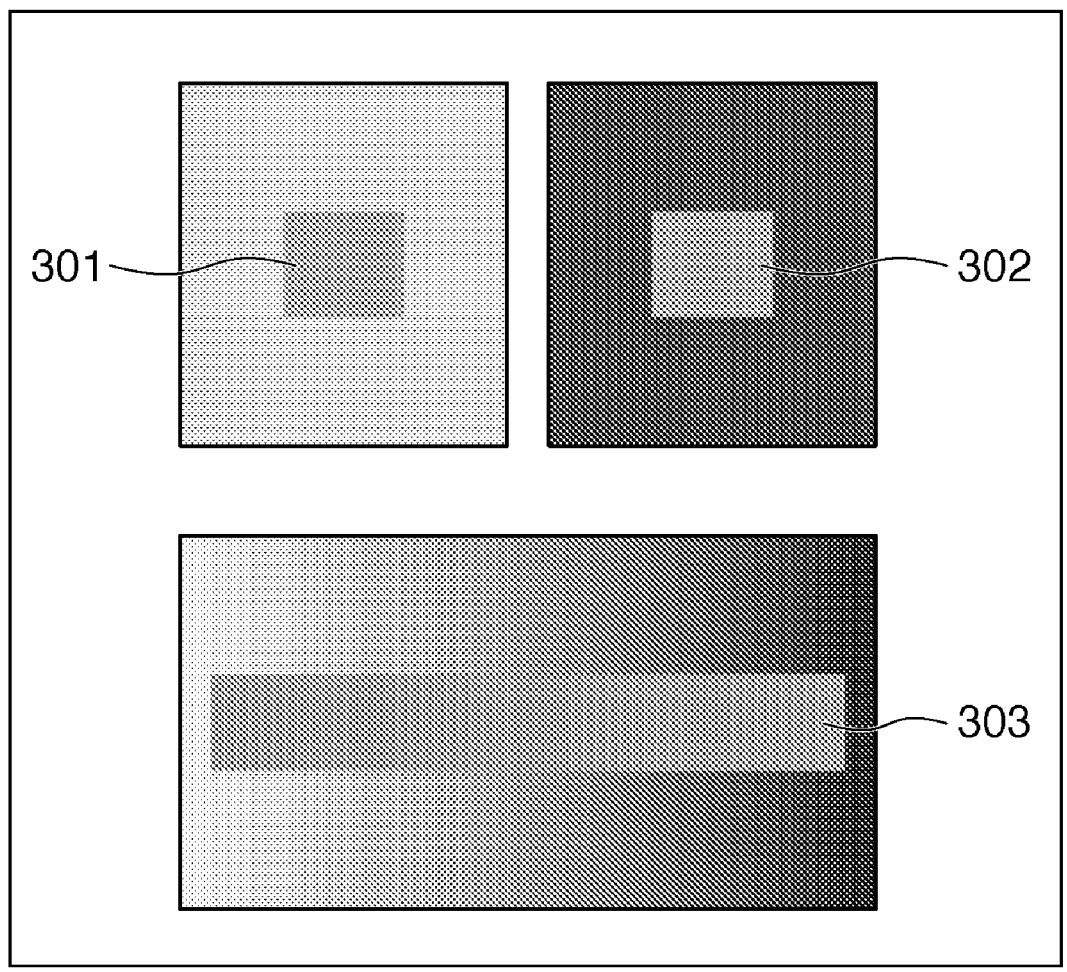
FIG. 3 is a diagram showing an example of display output affected by the influence of background color adaptation.

On the other hand, in a case where the color appearance accordance attribute 401 is "OFF," no particular color appearance accordance process is carried out, and therefore the appearances of the objects 301, 302, 303 will be influenced by the background color as shown in FIG. 3 for example in a same manner as conventionally, thus not necessarily being in accord.

Object Attribute Information Obtaining Section 103

Next, detailed description is given regarding a process of obtaining object attribute information in the object attribute information obtaining section 103.

Of the object images contained in the document data input by the input section 101, the object attribute information obtaining section 103 collects those whose attributes indicate that they are to be output so as to be a target appearance color, which is described later, that is, those whose aforementioned color appearance accordance attribute is ON. Then, an object information list is generated that describes a result of the collection.

FIG. 5 shows one example of an object information list generated according to the present embodiment. In FIG. 5, the object information list is constituted by an object ID, an sRGB color value, which is the output color of the object, and information of the image region in the document. It should be noted that in FIG. 5, in order to simplify description, only the region information and display color are shown as items in the object information list, but in fact other settings are also necessary in giving consideration to such factors as clipping due to overlaps between object images.

The object information list that has been generated is communicated to the color appearance model forward conversion section 104, the surrounding adaptive background color obtaining section 106, and the color appearance model reverse conversion section 107, thus aiming to achieve appearance color accordance for the object images in the list.

Color Appearance Model Forward Conversion Section 104

Next, detailed description is given regarding color appearance model forward conversion processing in the color appearance model forward conversion section 104.

The color appearance model forward conversion section 104 uses color appearance model forward conversion to calculate target appearance color values, which are targets of appearance colors for specified sRGB values as color information for object images listed in the object information list. An ordinary method can be applied as a conversion method. Hereinafter, a color appearance model forward conversion method is described using a color appearance model such as CIECAM97s and CIECAM02.

First, an equation for converting from CIE1931 XYZ tristimulus values to an RGB color space of sensitivity to long, middle, and short wavelengths for aptly describing human chromatic adaptation can be given by the following equation (1).

$$\begin{bmatrix} R \\ G \\ B \end{bmatrix} = M_{CAT02} \begin{bmatrix} X \\ Y \\ Z \end{bmatrix} \qquad (1)$$

Mcat02 in equation (1) is a chromatic adaptation matrix, and details thereof are described in Publication CIE 159 and elsewhere, and therefore further description is not included here.

For example, to calculate target appearance color values for certain sRBG values (sR, sG, sB), first CIE1931 XYZ values are calculated corresponding to the values (sR, sG, sB). Then, further still, using the aforementioned equation (1), conversion is performed to RGB values of a color space of sensitivity to long, middle, and short wavelengths for aptly describing human chromatic adaptation.

Next, in the present embodiment, consideration is given to the background colors of the target appearance color in order to control an actual appearance of objects. First, an adaptation factor is set as D indicating a device white, that is, a degree of adaptation to a display device or a display white. In other words, the adaptation factor D is a value that takes into account ambient light conditions and the like, and details thereof are described in Publication CIE 159 and elsewhere, and therefore further description is not included here.

Then, when the device white is normalized at 100 and the RGB values of the adaptive white point are set as RwGwBw, prediction equations expressing appearance values RcGcBc are as follows:

$$Rc=[100 \cdot D/Rw+(1-D)]R \qquad (2)$$

$$Gc=[100 \cdot D/Gw+(1-D)]G \qquad (3)$$

$$Bc=[100 \cdot D/Bw+(1-D)]B \qquad (4)$$

Here, in the present embodiment, the device white is used as the background color of the target appearance color, and a reason for this is described below. The target appearance color is perceived darkest when the background color is white, and therefore the following occurs when employing the darkest color in the reproduction color as the target appearance color. Namely, if the background color is a darker color than the device white, then a perceived color equivalent to the target appearance color can be obtained when a darker color than the reproduction color of the target appearance color is reproduced on an output device. For this reason, by using the device white as the background color of the target appearance color, the reproduction color on the output device becomes easier to achieve within the color range of the output device. Accordingly, it is suitable to use the device white as the background color of the target appearance color.

As described above, in the color appearance model forward conversion section 104, the adaptive white RwGwBw, which is a parameter of CIECAM02, is applied in the color appearance model forward conversion equations (2) to (4) using the adaptive factor D, which takes into account ambient light conditions and the like, as the background color (device white). In this way, target appearance color values RcGcBc according to the present embodiment are calculated.

Surrounding Adaptive Background Color Obtaining Section 106

Next, detailed description is given regarding a process of obtaining a surrounding adaptive background color in the surrounding adaptive background color obtaining section 106.

Based on display region information in the object information list, the surrounding adaptive background color obtaining section 106 obtains a surrounding adaptive background color that is influenced by adaptation of color perceived by humans based on pixel values of pixels around the pixel for each pixel in the object image display region. In the present embodiment, for example, a low pass filter process is executed on the image, which has undergone rendering in the rendering section 102 and is in a device independent color space, which is a color space not dependent on a device, thus generating an image having color values of the corresponding surrounding adaptive background color for each pixel. It should be noted that detailed description of this image generating method is given by M. D. Fairchild in Color Appearance Models (2nd Edition), and therefore description is not included here. What is important here is that the low pass filter is required to have properties dependent on the observation distance and the viewing angle at which the display device or the printed output is observed, namely, a spatial frequency as viewed by an observer. That is, an image is generated having color values of the surrounding adaptive background colors using a low pass filter that gives consideration to the two-degree field of view or the ten-degree field of view prescribed by the CIE.

Furthermore, a method in which the background color is obtained using a technique of averaging the background region by determining a background rectangular area for the pixel of interest dependent on a two-degree field of view or a ten-degree field of view, and the observation distance is known as another method of obtaining the surrounding adaptive background color. This method is commonly known, and therefore description is not included here.

By using one of the aforementioned methods or another method, the surrounding adaptive background color obtaining section 106 obtains color values of surrounding adaptive background colors corresponding to each pixel in the image that has undergone rendering in the device independent color space.

Color Appearance Model Reverse Conversion Section 107

Next, detailed description is given regarding color appearance model reverse conversion processing in the color appearance model reverse conversion section 107.

The aforementioned color appearance model forward conversion section 104 has calculated a target appearance color, which is an appearance color target for the sRGB values, for object images having background color. The color appearance model reverse conversion section 107 calculates an actual color (hereinafter, reproduction color) so as to achieve the target appearance color. This is carried out by the color appearance model reverse conversion section 107 performing reverse conversion of the color appearance model executed by the color appearance model forward conversion section 104.

Reverse conversion equations derived respectively from the equations (2) to (4) executed by the aforementioned color appearance model forward conversion section 104 are shown below in equations (5) to (7).

$$R=Rc/[100 \cdot D/Ra+(1-D)] \qquad (5)$$

$$G=Gc/[100 \cdot D/Ga+(1-D)] \qquad (6)$$

$$B=Bc/[100 \cdot D/Ba+(1-D)] \qquad (7)$$

In equations (5) to (7), RcGcBc are target appearance color values obtained by the color appearance model forward conversion section 104. Furthermore, RaGaBa are color values of surrounding adaptive background colors corresponding to each pixel of an image obtained by the surrounding adaptive background color obtaining section 106 for object images that have undergone rendering.

In order to calculate reproduction colors of object images to ensure accordance in appearance colors, the color appearance model reverse conversion section 107 first obtains the appearance color target values RcGcBc determined by the color appearance model forward conversion section 104. Next, region information of object images is obtained from the object information list determined by the object attribute information obtaining section 103, and surrounding adaptive background colors RaGaBa corresponding respectively to all the pixels contained in the object image display region are obtained by the surrounding adaptive background color obtaining section 106. Then, using equations (5) to (7), output color RGB is obtained so as to enable output of the target values RcGcBc of the appearance colors for all pixels contained in the object image to achieve accordance in appearance colors.

The output colors RGB obtained here are converted to CIE XYZ values using reverse conversion of equation (1), then further converted to sRGB values as display values in a device independent color space image.

Output Color Updating Section 108

Next, detailed description is given regarding a process of updating an output color of an object image region in the output color updating section 108.

As described above, the color appearance model reverse conversion section 107 has calculated display sRGB values in the device independent color space image capable of achieving accordance in appearance colors for all pixels in the object images targeted for appearance color accordance. The output color updating section 108 writes the sRGB values of each pixel calculated by the color appearance model reverse conversion section 107 over the sRGB values of pixels corresponding to the image that has undergone rendering by the rendering section 102 and is in the device independent color space.

It should be noted that the device independent color space image in which pixel values have been updated by the output color updating section 108 undergoes color matching in the output section 109 to a device color space for display or printing, and is then displayed or printed.

Color Conversion Processing in the Present Embodiment

Figure 2B:
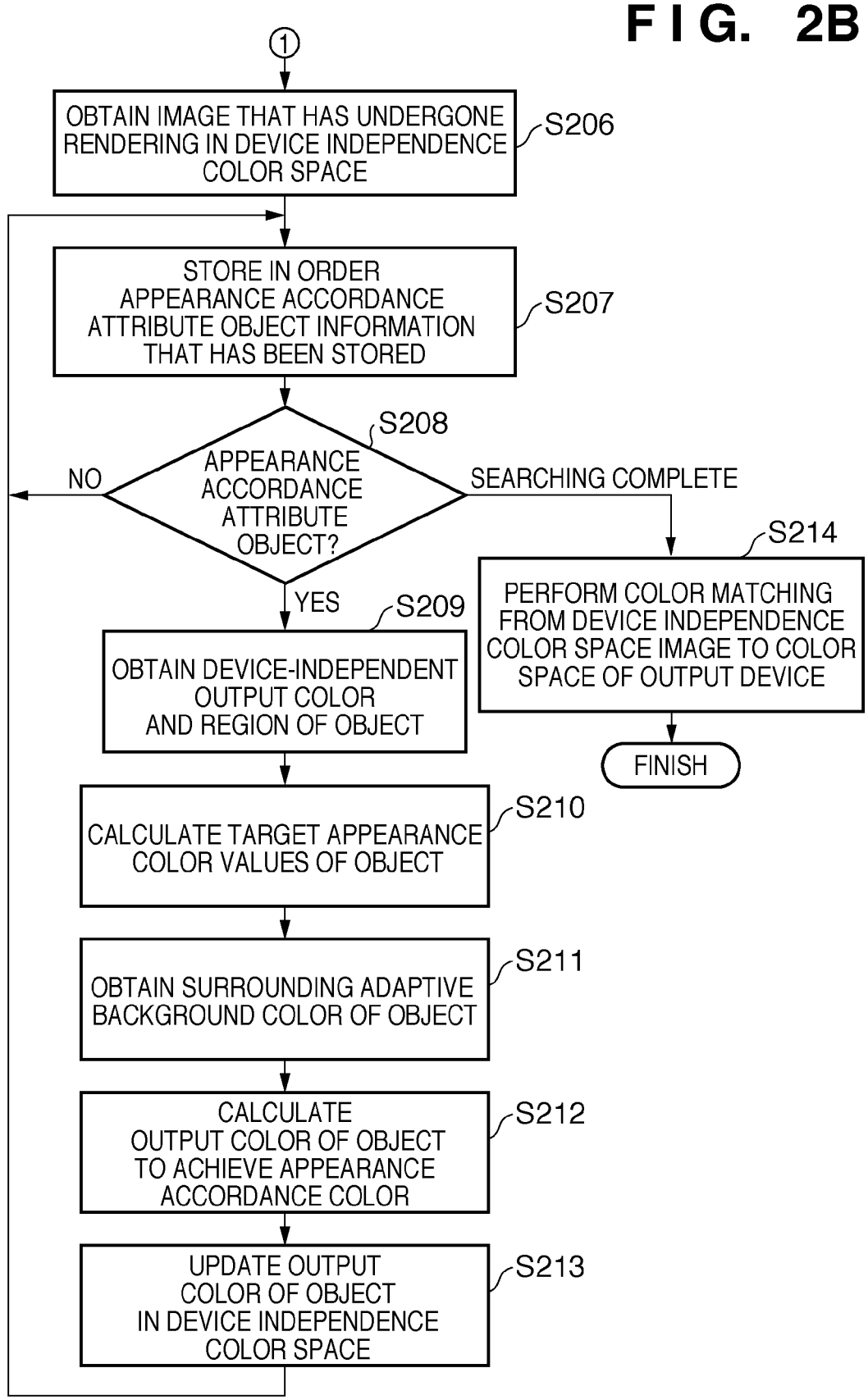

FIG. 2A and FIG. 2B are a flowchart showing a color conversion process according to the present embodiment.

First, in step S201, the object image data to be processed is input by the input section 101. Then, in step S202, a determination is performed as to whether or not rendering by the rendering section 102 has been completed for all the input object image data. If it is determined that rendering has been completed, the procedure proceeds to step S206. On the other hand, if it is determined that rendering has not been completed, the procedure proceeds to step S203.

In step S203, the object attribute information obtaining section 103 examines the attributes of object images being processed and if the color appearance accordance attribute is set to ON, the attribute information of the object images is saved in step S204, then the procedure proceeds to step S205. On the other hand, if the color appearance accordance attribute is OFF, then the procedure directly proceeds to step S205.

In step S205, rendering is carried out on the object images by the rendering section 102, and device independent color space images are generated. Then the procedure returns to step S201.

After rendering is completed (YES in step S202), the device independent color space images are obtained in step S206. Then, in step S207, the object information list generated in step S204 is searched in order, and a determination is performed in step S208 as to whether or not the color appearance accordance attribute is ON. If it is determined that the color appearance accordance attribute is not ON, then the processing returns to step S207.

If it is determined that the color appearance accordance attribute is ON, then next, in step S209, an output color and display region of the object image is obtained from the object information list. In the following step S210, color appearance model forward conversion is executed by the color appearance model forward conversion section 104 on the output colors obtained from the object information list, thus calculating target appearance color values. In step S211, surrounding adaptive background colors are obtained by the surrounding adaptive background color obtaining section 106 for each pixel of the object image display region based on the display region information of the object information list.

Then, in step S212, display values are calculated by the color appearance model reverse conversion section 107 for the device independent color space image corresponding to all the pixels contained in the object image region. The reverse conversion calculates are carried out based on the target appearance color values calculated by the color appearance model forward conversion section 104, the color values of the surrounding adaptive background colors obtained by the surrounding adaptive background color obtaining section 106, and the image region information in the object information list.

Then, in step S213, the output color updating section 108 overwrites all pixel values of corresponding pixels to output values of the device independent color space image calculated by the color appearance model reverse conversion section 107 for device independent color space images that have undergone rendering.

When processing is completed in step S208 for all object images whose color appearance accordance attribute is ON, the procedure proceeds to step S214. In step S214, the output section 109 executes color matching on the device independent color space image to device-dependent color space values for display or printed output, after which display or printed output is carried out, thus completing the present process.

As described above, with the present embodiment, in carrying out rendering on object data containing color data and drawing commands, color appearance model conversion is carried out giving consideration to the background colors of the objects. Accordingly, it is possible to eliminate the influence of background color adaptation for a plurality of objects respectively having a same output color specified within a single sheet of a document and achieve accordance in appearance among these.

Detailed description was given above of an example embodiment, but the present invention is also achievable in embodiments such as a system, an apparatus, a method, a program, or a recording medium (storage medium). Specifically, it may also be applied to a system constituted by multiple devices (such as a host computer, an interface device, an image sensing apparatus, and a Web application) and may also be applied to an apparatus constituted by a single device.

It should be noted that the present invention may also be accomplished by supplying directly or remotely a software program that achieves the functions of the foregoing embodiments to a system or an apparatus, and having a computer of the system or apparatus read out and execute the supplied program code. It should be noted that "program" in this case refers to a program that is computer-readable and corresponds to the flowchart shown in the figures pertaining to the embodiments.

Consequently, the actual program code to be installed on a computer to achieve the functional processing of the present invention on the computer achieves the present invention. That is, the present invention also includes an actual computer program for achieving the functional processing of the present invention.

In this case the program may take any form and may be object code, a program to be executed by an interpreter, or script data supplied to an OS as long as it has the functionality of the program.

Recording media for supplying the program include the media shown below. For example, this includes floppy disks, hard disks, optical disks, magneto-optical disks, CD-ROM, CR-R, CR-RW, magnetic tape, nonvolatile memory cards, ROM, DVD (DVD-ROM, DVD-R) and the like.

The methods described below are also possible as methods for supplying the program. Namely, an actual computer program (or a compressed file containing an automatic installation function) of the present invention may be downloaded onto a recording medium such as a hard disk by connecting to an Internet website via a browser on a client computer.

Furthermore, it is also possible to achieve the present invention by having the program code that constitutes the program of the present invention divided into a plurality of files and downloading the respective files from different websites. That is, a WWW server that enables a plurality of users to download the program files for achieving the functional processing of the present invention on a computer is also included within the present invention.

Furthermore, it is also possible to encode the program of the present invention for storage on a storage medium such as a CD-ROM, which is then distributed to users, and users who pass a predetermined condition may be allowed to download from a website via the Internet information of a key that decodes the encoding. That is to say, users who execute the encoded program by using the key information are able to install the program on a computer.

Furthermore, the functionality of the foregoing embodiment is achieved by having a computer execute the program that has been read out. Further still, an OS or the like that runs on a computer may carry out a part or all of the actual processing according to instructions of the program such that the functionality the above-described embodiment is achieved by the processing thereof.

Further still, the program that is read out from the recording medium may be written onto a memory provided in an extension board inserted into the computer or an extension unit connected to the computer, after which the functionality of the foregoing embodiments can be achieved by executing the program. That is, it is possible that a CPU or the like provided in the extension board or extension unit may carry out a part or all of the actual processing according to instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-259234, filed Oct. 2, 2007, which is hereby incorporated by reference herein in its entirety.

What is claimed is:

1. An image processing apparatus for converting an image having a plurality of objects, comprising:
a rendering unit configured to perform rendering on an image using object information of the plurality of objects;
a forward conversion unit configured to carry out forward conversion processing of a color appearance model on color information of the object in which a pixel of interest is contained, and calculate target color information of the pixel of interest;
a surrounding adaptive background color obtaining unit configured to generate surrounding adaptive background color information of the pixel of interest based on pixels around the pixel of interest in the object of the image that has undergone rendering;
a reverse conversion unit configured to carry out reverse conversion of a color appearance model on the target color information based on the surrounding adaptive background color information to calculate output color information; and
a setting unit configured to set the output color information as color information of the pixel of interest in the image that has undergone rendering.

2. The image processing apparatus according to claim 1, wherein the object includes a color appearance accordance attribute, and the reverse conversion unit controls whether to calculate output color information for the object in accordance with the color appearance accordance attribute of the object.

3. The image processing apparatus according to claim 1, wherein the forward conversion unit calculates the target appearance color using white as the background color of the object.

4. The image processing apparatus according to claim 1, wherein the surrounding adaptive background color obtaining unit uses a low pass filter corresponding to an observation distance and a viewing angle at which an output image is to be observed.

5. The image processing apparatus according to claim 4, wherein the low pass filter has properties corresponding to a two-degree field of view or a ten-degree field of view prescribed by CIE.

6. The image processing apparatus according to claim 1, wherein the surrounding adaptive background color obtaining unit generates the surrounding adaptive background color by determining a background rectangular area for the pixel of interest dependent on a two-degree field of view or a ten-degree field of view, and an observation distance, and averaging the background rectangular area.

7. The image processing apparatus according to claim 1, wherein the reverse conversion unit of the color appearance model uses a same color appearance model as the color appearance model of the forward conversion unit.

8. An image processing method for converting an image having a plurality of objects, the method comprising:
a rendering step of performing rendering on an image using object information of the plurality of objects;
a forward conversion step of carrying out forward conversion processing of a color appearance model on color information of the object in which a pixel of interest is contained, and calculating target color information of the pixel of interest;
a surrounding adaptive background color obtaining step of generating surrounding adaptive background color information of the pixel of interest based on pixels around the pixel of interest in the object of the image that has undergone rendering;
a reverse conversion step of carrying out reverse conversion of a color appearance model on the target color information based on the surrounding adaptive background color information to calculate output color information; and
a setting step of setting the output color information as color information of the pixel of interest in the image that has undergone rendering.

9. The image processing method according to claim 8, wherein the object includes a color appearance accordance attribute, and in the reverse conversion step of the color appearance model, control is performed as to whether to calculate output color information for the object in accordance with the color appearance accordance attribute of the object.

10. A non-transitory computer-readable storage medium storing a computer program, the computer program causing a computer to implement an image processing method for converting an image having a plurality of objects comprising:
rendering on an image using object information of the plurality of objects;
carrying out forward conversion processing of a color appearance model on color information of the object in which a pixel of interest is contained, and calculating target color information of the pixel of interest;

generating surrounding adaptive background color information of the pixel of interest based on pixels around the pixel of interest in the object of the image that has undergone rendering;

carrying out reverse conversion of a color appearance model on the target color information based on the surrounding adaptive background color information to calculate output color information; and setting the output color information as color information of the pixel of interest in the image that has undergone rendering.

* * * * *